June 27, 1967 R. LEE 3,328,703

HIGH EFFICIENCY PULSE MODULATOR

Filed Feb. 1, 1966

INVENTOR.
REUBEN LEE
BY
ATTYS.

United States Patent Office 3,328,703
Patented June 27, 1967

3,328,703
HIGH EFFICIENCY PULSE MODULATOR
Reuben Lee, Baltimore, Md., assignor, by mesne assignments, to the United States of America as represented by the Secretary of the Navy
Filed Feb. 1, 1966, Ser. No. 526,322
7 Claims. (Cl. 328—65)

ABSTRACT OF THE DISCLOSURE

A pulse forming circuit of the line modulator type is provided with a feedback network for charging a coil with the waste electrical energy which would otherwise be converted to heat. The conserved energy is reapplied to the input of the system.

---

The present invention relates to a pulse modulator and more particularly to a high efficiency pulse modulator which utilizes a portion of the waste energy present in the output circuit.

The prior art pulse modulators generally operate satisfactorily. However, it has been found that the energy remaining or stored in the transformer may cause ringing to occur. Additionally part of the stored energy in the prior art pulse modulators is converted to heat in the transformer which presents heat dissipation problems.

The present invention eliminates or substantially reduces the aforementioned problems present in the prior art pulse modulators by utilizing part of the stored energy in the transformer to charge the pulse forming network. In order to utilize this energy, a feedback path is provided from the output transformer to the input of the pulse forming network.

An object of the present invention is to provide a highly efficient pulse modulator which utilizes the wasted energy stored in the output transformer.

A further object of the present invention is to provide a pulse modulator for a radar set which produces a minimum amount of heat in the output transformer.

Very briefly, the invention comprises a pulse modulator having a pulse forming network and an output transformer connected in series. A unidirectional conducting means is coupled between the output transformer and the input of the pulse forming network for transferring energy from the transformer to the input of the pulse forming network.

Other objects and many of the attendant advantages of this invention will be readily appreciated as the same becomes better understood by reference to the following detailed description when considered in connection with the accompanying drawings wherein.

Figure 1:
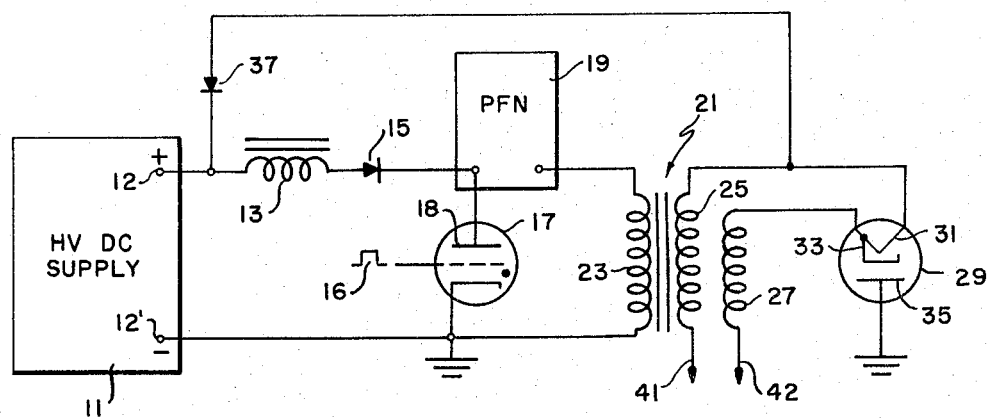
FIG. 1 is a circuit diagram of a high efficiency pulse modulator embodying the invention.

Referring particularly to FIG. 1, a high voltage D.C. power supply 11 is provided with two output terminals 12 and 12'. 12' is connected to ground of a circuit network to be spelled out hereafter. One side of a charging choke 13 is connected to the output terminal 12 of the high voltage power supply and the other end of the charging choke 13 is connected to the anode of diode 15. A thyratron 17 having an anode, a control grid and a plate 18 is connected to the cathode of diode 15. The cathode of the thyratron 17 is connected to the common ground terminal. A trigger pulse illustrated on the drawing as 16 is applied to the control grid of the thyratron causing the thyratron to fire. The plate 18 of the thyratron 17 is connected to the input terminal of a pulse forming network 19. The output terminal of the pulse forming network 19 is connected to one end of the primary winding 23 of the transformer 21. The other end of the primary winding 23 is connected to ground. The transformer 21 is also provided with secondary windings 25 and 27. One end of the secondary winding 25 is connected to one end of a filament 31 of the RF oscillator tube 29 and one end of the secondary winding 27 of the transformer 21 is connected to the other end of the filament element 31 of the RF oscillator tube 29. The cathode 33 of the RF oscillator tube is directly connected to the filament 31. The plate 35 of the RF oscillator tube 29 is directly connected to ground. The other ends 41 and 42 of the secondary windings are connected to a source of heater current for the RF oscillator tube as is conventional in the art. A diode 37 is provided having its anode connected to the secondary winding 25 of the transformer 21 and to the heating filament 31 of the RF oscillator tube 29. The cathode of the diode 37 is connected to the input of the charging choke 13 which is at the terminal 12 of the high voltage D.C. supply 11.

The operation of circuit disclosed in FIG. 1 is as follows: The pulse forming network 19 is charged from the high voltage D.C. power supply 11 through the charging choke 13 and the diode 15. If no pulse arrives at the control grid of the thyratron 17, then the pulse forming network charges up to a steady state condition. Upon the arrival of a pulse 16 on the control grid of the thyratron 17, the thyratron becomes conductive, thus discharging the pulse forming network 19 and causing a negative output signal to be delivered to the primary winding 23 of the transformer 21. The pulse on the primary winding 23 causes a negative output pulse to develop across the secondary windings 25 and 27. After the pulse forming network 19 completely discharges, the thyratron 17 becomes non-conductive. During this point of operation, the energy which is stored in the transformer 21 normally tends to develop a back swing of positive voltage. The turns ratio of the transformer 21 is such that this backward swing of the transformer 21 induces a pulse many times greater than the high voltage D.C. supply 11. The positive pulse developed by the transformer 21 on the back swing is conducted through the diode 37 to the input of the charging choke 13 through the diode 15 to the pulse forming network 19 wherein it charges the pulse forming network 19. After the energy in the secondary windings of the transformer 21 falls to a value which is below the voltage developed by the high voltage D.C. power supply 11, then the diode 37 ceases to conduct and is in effect back biased by the high voltage D.C. power supply. In this manner, the energy which is normally dissipated due to the backswing of the transformer 21 is actually conducted to the input of the circuit and reused by the pulse forming network 19, thereby conserving the electrical energy and preventing any dissipation thereof in the form of heat and thereby eliminating the need to remove this heat generated by the transformer 21.

Figure 2:
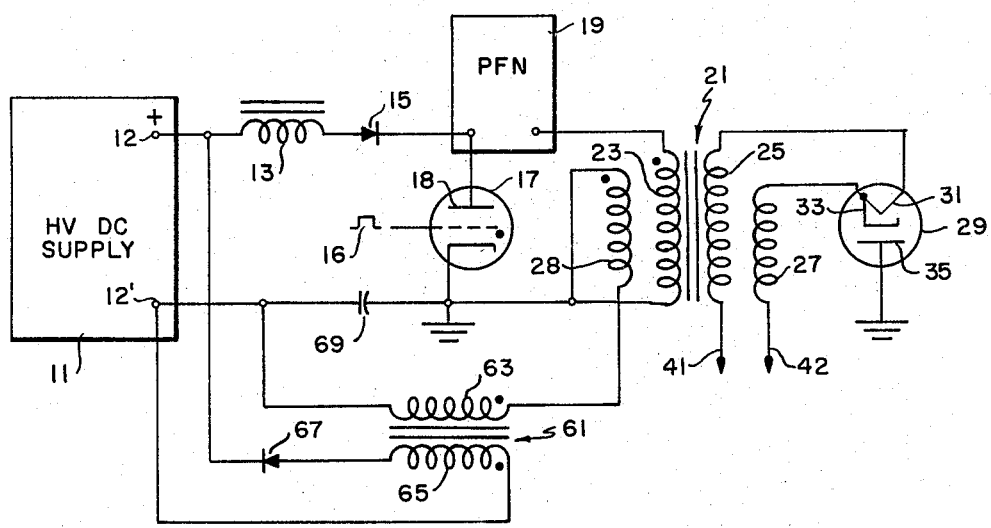
FIG. 2 is a circuit diagram of an alternate embodiment of the high efficiency pulse modulator embodying the invention.

Referring to FIG. 2, illustrating the alternate embodiment of the invention similar components operating in a fashion similar to those in FIG. 1 contain the same numerical indicia and will not be further described in FIG. 2. The embodiment of the invention illustrated in FIG. 2 differs from that shown in FIG. 1. However, in that the transformer 21 is provided with a third secondary winding 28 which is connected in series with primary winding 63 of another transformer 61. The other end of the primary winding 63 of the transformer 61 is connected to the terminal 12' of the high voltage D.C. power supply. A condenser 69 is connected between the terminal 12' of the high voltage D.C. power supply and ground.

The secondary winding 65 of the transformer 61 has one of its ends connected to the terminal 12' of the high voltage D.C. power supply and its other end connected to the anode of a diode 67. The cathode of the diode 67 is connected to the input of the charging choke 13 at the terminal 12 of the high voltage D.C. power supply.

The operation of the embodiment of the invention shown in FIG. 2 is as follows: A pulse supplied to the thyratron 17 triggers it and causes the pulse forming network to generate a pulse as described in FIG. 1; however, when the pulse forming network is discharged and the thyratron ceases to conduct, the negative voltage signal supplied by the pulse forming network ceases to exist. When this happens, the transformer 21 generates a reverse polarity positive pulse or back swing as is commonly known in the art. This back swing creates a positive pulse in the winding 28 which supplies the energy to the bias transformer 61. The bias transformer 61 then supplies a positive going energy wave to the diode 67 which in turn feeds the positive energy to the input terminal 12 to the input of the charging choke 13. The diode 67 will conduct as long as the voltage developed by the secondary 65 of the transformer 61 is greater than the voltage of the high voltage D.C. power supply.

Obviously many modifications and variations of the present invention are possible in the light of the above teachings. It is therefore to be understood that within the scope of the appended claims the invention may be practiced otherwise than as specifically described.

What is claimed is:
1. A high efficiency pulse modulator comprising:
   a pulse forming network having an input and an output;
   a source of direct current voltage having an output connected to the input of said pulse forming network;
   a transformer having a primary winding and a secondary winding, said primary winding being connected to said output of said pulse forming network; and
   means for transferring the back swing voltage developed in said transformer directly connected between said transformer secondary winding and said pulse forming network input whereby the energy stored in said transformer is reused by said pulse forming network.
2. A high efficiency pulse modulator as defined in claim 1 but further characterized by having a charging choke and a diode connected in series between said pulse forming network input and said direct current voltage source output.
3. A high efficiency pulse modulator as defined in claim 2 but further characterized by said means for transferring said backward voltage comprising a second diode.
4. A high efficiency pulse modulator as defined in claim 2 but further characterized by having said means for transferring said backward voltage comprising a second transformer containing a primary winding and a secondary winding, said second transformer primary winding being connected in series with said first transformer secondary winding, said second transformer secondary winding being connected in series with a second diode, said second diode having its output connected to said charging choke.
5. A high efficiency pulse modulator as defined in claim 4 but further characterized by said source of direct current voltage having a second output and a capacitor connected between said second output of said source of direct current voltage and said primary winding of said first transformer.
6. A high efficiency pulse modulator as defined in claim 1 but further characterized by having said means for transferring said backward voltage comprising a second transformer containing a primary winding and a secondary winding, said second transformer primary winding being connected in series, said first transformer secondary winding, said second transformer secondary winding being connected in series with a second diode, said second diode having its output connected to said pulse forming network input.
7. A high efficiency pulse modulator as defined in claim 1 but further characterized by said means for transferring said backward voltage comprising a second diode.

References Cited
UNITED STATES PATENTS

| | | | |
|---|---|---|---|
| 2,694,149 | 11/1954 | Gross | 328—65 |
| 3,119,968 | 1/1964 | Schonberg | 328—67 |
| 3,139,585 | 6/1964 | Ross et al. | 328—65 |

FOREIGN PATENTS

| | | |
|---|---|---|
| 885,235 | 12/1961 | Great Britain. |

ARTHUR GAUSS, *Primary Examiner.*

JOHN S. HEYMAN, *Examiner.*